United States Patent
Galmiche et al.

(10) Patent No.: US 10,756,606 B2
(45) Date of Patent: Aug. 25, 2020

(54) SEGMENTED ROTOR FOR AN ASYNCHRONOUS MACHINE AND AN ASYNCHRONOUS MACHINE HAVING SUCH A SEGMENTED ROTOR

(71) Applicant: GE Energy Power Conversion Technology Ltd, Rugby, Warwickshire (GB)

(72) Inventors: Christophe Galmiche, Champigneulles (FR); Remy Muller, Champigneulles (FR); Fabien Roche, Champigneulles (FR)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 398 days.

(21) Appl. No.: 15/724,605

(22) Filed: Oct. 4, 2017

(65) Prior Publication Data
US 2018/0102699 A1  Apr. 12, 2018

(30) Foreign Application Priority Data
Oct. 6, 2016  (FR) .................................. 16 59659

(51) Int. Cl.
*H02K 17/16* (2006.01)
*H02K 1/30* (2006.01)
(Continued)

(52) U.S. Cl.
CPC .............. *H02K 17/165* (2013.01); *H02K 1/26* (2013.01); *H02K 1/30* (2013.01); *H02K 7/003* (2013.01); *H02K 7/14* (2013.01); *H02K 15/0012* (2013.01)

(58) Field of Classification Search
CPC .......... H02K 17/165; H02K 1/26; H02K 1/30; H02K 7/003; H02K 7/14; H02K 15/0012
See application file for complete search history.

(56) References Cited

U.S. PATENT DOCUMENTS

| 729,449 A | 5/1903 | Thomson |
|---|---|---|
| 1,351,270 A | 8/1920 | Wilkinson |

(Continued)

FOREIGN PATENT DOCUMENTS

| CN | 2919669 Y | 7/2007 |
|---|---|---|
| DE | 39 07 860 A1 | 12/1989 |

(Continued)

OTHER PUBLICATIONS

Preliminary Search Report and Written Opinion issued in connection with corresponding FR Application No. 1659659 dated Jun. 23, 2017.

(Continued)

*Primary Examiner* — Emily P Pham
(74) *Attorney, Agent, or Firm* — Wood IP LLC (57) ABSTRACT

A rotor for an asynchronous electrical machine comprising a magnetic ring comprising a plurality of layers of ferromagnetic metal sheets stacked axially and a squirrel cage having a plurality of conductive elements regularly distributed over the periphery of the magnetic ring and each having two opposite ends extending axially beyond the magnetic ring and each connected to a short-circuit crown, arranged axially on either side of the magnetic ring and intended to connect the ends of the conductive elements electrically. The rotor is segmented circumferentially into at least two rotor segments.

24 Claims, 8 Drawing Sheets

(51) Int. Cl.
*H02K 15/00* (2006.01)
*H02K 1/26* (2006.01)
*H02K 7/14* (2006.01)
*H02K 7/00* (2006.01)

(56) References Cited

U.S. PATENT DOCUMENTS

| | | | |
|---|---|---|---|
| 1,808,572 A | 6/1931 | Reist | |
| 4,942,324 A | 7/1990 | Ooyama et al. | |
| 5,530,310 A * | 6/1996 | Sauer | H02K 17/165 |
| | | | 310/211 |
| 6,302,253 B1 * | 10/2001 | Link | F02N 11/04 |
| | | | 192/55.61 |
| 6,867,522 B1 * | 3/2005 | Vlemmings | H02K 17/165 |
| | | | 310/125 |
| 8,581,464 B2 | 11/2013 | Lokhandwalla et al. | |
| 10,381,906 B2 * | 8/2019 | Berger | H02K 17/165 |
| 2004/0012293 A1 * | 1/2004 | Kuemmlee | H02K 17/165 |
| | | | 310/211 |
| 2007/0096587 A1 * | 5/2007 | Ionel | H02K 1/148 |
| | | | 310/216.009 |
| 2012/0228985 A1 * | 9/2012 | Hayahi | H02K 15/0012 |
| | | | 310/211 |
| 2012/0282122 A1 * | 11/2012 | Huth | H02K 1/278 |
| | | | 417/423.7 |
| 2013/0020899 A1 * | 1/2013 | Kleber | H02K 15/0012 |
| | | | 310/211 |
| 2013/0187511 A1 * | 7/2013 | Lipot | H02K 15/0012 |
| | | | 310/211 |
| 2016/0141923 A1 * | 5/2016 | Frolich | H02K 1/246 |
| | | | 310/46 |
| 2016/0141944 A1 | 5/2016 | Berger et al. | |
| 2016/0211708 A1 * | 7/2016 | Bittermann | H02K 1/22 |

FOREIGN PATENT DOCUMENTS

| | | |
|---|---|---|
| DE | 10 2013 211040 A1 | 12/2014 |
| EP | 0 439 739 A1 | 8/1991 |
| JP | S50-1245 A | 1/1975 |
| JP | 2001-025844 A | 1/2001 |

OTHER PUBLICATIONS

Extended European Search Report and Opinion issued in connection with corresponding EP Application No. 17194045.5 dated Mar. 15, 2018.

* cited by examiner

SEGMENTED ROTOR FOR AN ASYNCHRONOUS MACHINE AND AN ASYNCHRONOUS MACHINE HAVING SUCH A SEGMENTED ROTOR

BACKGROUND OF THE INVENTION

This invention relates to the field of rotating electrical machines with asynchronous technology.

More particularly, this invention relates to rotors used in such asynchronous rotating electrical machines.

An asynchronous rotating electrical machine, also called an "induction machine", is an alternating-current electrical machine principally comprising a stator, a rotor without a physical connection with the stator, and a torque transmission shaft integral with the rotor. Said rotor comprises a winding consisting of short-circuited conductors and traversed by currents induced by a magnetic field created by the currents of the stator, unlike a synchronous machine wherein the magnetic field of the rotor is created by permanent magnets or coils supplied by direct current.

The rotor of an asynchronous electrical machine may, for example, be of the "squirrel-cage" type, comprising a plurality of layers of axially stacked ferromagnetic metal sheets forming a magnetic ring and a squirrel cage. For example, a magnetic ring of 1,000 mm axial length comprises two thousand layers of axially stacked ferromagnetic metal sheets, each of 0.5 mm thickness, or one thousand five hundred and thirty-eight layers of axially stacked ferromagnetic metal sheets, each of 0.65 mm thickness.

In a manner known in itself, the squirrel cage comprises a plurality of conductive elements regularly distributed over the periphery of the magnetic ring, each having two opposite ends extending axially beyond the magnetic ring. The conductive elements are made of an electrical material, such as copper, a copper alloy or aluminum. The squirrel cage further comprises two rings or short-circuit crowns, arranged axially on either side of the magnetic ring and intended to connect the ends of the conductive elements electrically. Each conductive element is in the form of a bar extending axially on either side of the magnetic ring and inserted axially in a notch cut close to the periphery of the magnetic ring. The section of the conductive bars may be circular, ovoid, square or rectangular in shape.

The ferromagnetic sheets are intended to guide the magnetic field lines, while the conductive elements are intended to accommodate the induced currents. The magnetic ring and the squirrel cage thus form the active part of the rotor.

When the external diameter of the rotor exceeds 1,250 mm, it is difficult to produce ferromagnetic sheets to be cut into magnetic sheet rolls with a width greater than 1,250 mm. Thus, there are magnetic rings comprising a plurality of layers of ferromagnetic metal sheets, wherein each sheet metal layer comprises ferromagnetic sheet segments, for example 18 in number, each forming an angular portion of 20°, stacked in the circumferential direction. For reasons of mechanical rigidity, the angular portions of each layer of sheets are offset angularly in order to avoid the alignment of the joining planes between the segments, which would weaken the magnetic ring. Thus, the axial covering of the segments from one layer of sheets to the other makes it possible to ensure the rigidity of the magnetic ring.

However, in the event of failure of a part of the rotor, it is necessary to disassemble the rotor as a whole, which involves a considerable maintenance cost.

In addition, it is necessary to assemble such a rotor directly on the operating site of the torque transmission shaft, which is generally difficult to do and expensive.

There is therefore a need to provide an asynchronous rotor for an asynchronous electrical machine capable of being manufactured on a site other than the operating site of the torque transmission shaft. There is also a need to reduce the time and cost of maintaining such an asynchronous rotor.

BRIEF DESCRIPTION OF THE INVENTION

Embodiments of this invention relates to a rotor for an asynchronous electrical machine comprising a magnetic ring comprising a plurality of axially stacked ferromagnetic metal layers and a squirrel cage having a plurality of conductive elements regularly distributed over the periphery of the magnetic ring, each having two opposite ends extending axially beyond the magnetic ring. Each of the ends of the conductive elements is connected to a short-circuit crown arranged axially on either side of the magnetic ring and intended to connect the ends of the conductive elements electrically.

The rotor is segmented circumferentially into at least two rotor segments.

The segmentation of the rotor according to embodiments of the invention thus has the effect of reducing the cost of manufacturing, transporting and maintaining the asynchronous electrical machine. In addition, it is possible to assemble an asynchronous rotor on a torque-transmitting shaft provided with fixing flanges at each of its ends having an external diameter greater than the internal diameter of the rotor, and also to manufacture the rotor segments at one site and then transport them to another site to assemble them on the torque transmission shaft.

The number of rotor segments is generally between two and thirty, in an embodiment the number is between eight and fourteen, for example ten.

A circumferential clearance may exist between two adjacent rotor segments. Said circumferential clearance may be, for example, between 0.05 mm and 5 mm, in an embodiment between 0.2 mm and 0.5 mm, for example equal to 0.4 mm. This circumferential clearance allows the easy assembly of the rotor segments in order to form the magnetic ring.

The number of electrical poles is, for example, different from the number of rotor segments. In fact, it is possible, for example, to have ten rotor segments but twelve electrical poles.

According to one embodiment, each short-circuit crown is also segmented circumferentially into at least two crown segments connected electrically, for example by a flexible connection, by welding, by brazing, by electrical cables or by an electrical braid.

The number of crown segments is, for example, equal to or different from the number of rotor segments. When the number of crown segments is a multiple of the number of rotor segments, in the event of a rotor segment failure it is possible to disassemble only a part of the rotor.

The crown segments can be spaced circumferentially with a circumferential clearance of between 0.2 mm and 5 mm in order to facilitate the assembly of the crown segments.

According to one embodiment, each rotor segment comprises two half-segments that are substantially identical to each another and are fixed axially on either side of a central metal sheet integral with the torque transmission shaft, for example by a screwed assembly. The central metal sheet is, for example, made of a conductive material, such as steel.

According to a second aspect, the invention relates to an asynchronous electrical machine comprising a stator, a rotor as described above and a torque transmission shaft integral with the rotor.

According to one embodiment, each of the rotor segments is fixed to the torque transmission shaft by form-fitting male and female elements, for example a dovetail, T-shape, or any other shape enabling the holding of the rotor segments on the shaft in the radial direction.

In general, each rotor segment comprises, over the entire length of its lower surface or locally, a male or female element in a form-fitting relationship respectively with a female or male element arranged on the external surface of the torque transmission shaft.

According to another embodiment, each of the rotor segments is fixed to the torque transmission shaft by means of a rim.

The fixation of the rim with the rotor segments can be achieved, for example, by radial screws, studs and nuts or by male and female elements in a form-fitting manner.

In other words, each rotor segment comprises, over the entire length of its lower surface or locally, a male or female element in a form-fitting relationship respectively with a female or male element arranged on the external surface of the rim. The form-fitting male or female elements may be dovetail-shaped, T-shaped, or of any other shape allowing the rotor segments to be held on the rim in the radial direction.

The rim may be segmented into at least two rim segments. The number of rim segments may be equal to or different from the number of rotor segments.

For example, the rim segments are welded together.

According to one embodiment, the rim segments are fastened to the torque transmission shaft by screws or bolts, by welding or by shrinking.

According to another embodiment, the rim is fixed to the torque transmission shaft by means of a torque transmission element between the rim and the torque transmission shaft, said torque transmission element being segmented into at least two washer segments, the number of washer segments being independent of the number of rim segments when it is segmented.

Each washer segment of the torque transmission element can, for example, be made integral respectively with the torque transmission shaft and the rim by a screwed assembly.

According to another embodiment, the torque transmission element is in the form of at least two half-shells of 180° assembled and at the rim by fasteners in order to fix them to the torque transmission shaft by tightening.

According to another embodiment, the rim may be formed in one 360° piece by forging the torque transmission shaft.

According to another embodiment, the torque transmission shaft comprises at least four radial portions regularly distributed on the circumference of said shaft and extending radially towards the rotor, the rim being welded to the free ends of said radial portions.

The torque transmission shaft comprises two fixing flanges at each of its ends. The external diameter of the fixing flanges may be greater than the internal diameter of the magnetic ring of the asynchronous rotor. In this case, the segmentation of the rotor, the short-circuit crowns and the rims in at least two angular portions is particularly advantageous.

BRIEF DESCRIPTION OF THE DRAWINGS

Other objects, characteristics and advantages of the invention will become apparent on reading the following description, given solely by way of non-limiting example, with reference to the accompanying drawings, in which.

DETAILED DESCRIPTION OF THE INVENTION

Figure 1:
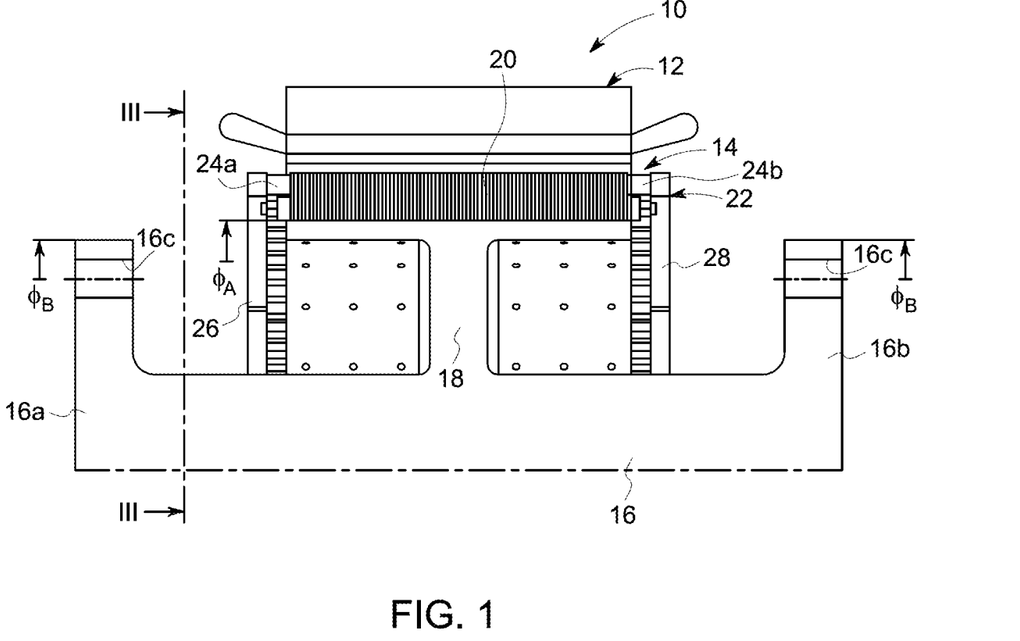
FIG. 1 is a longitudinal sectional view of an asynchronous electrical machine.
Figure 2:
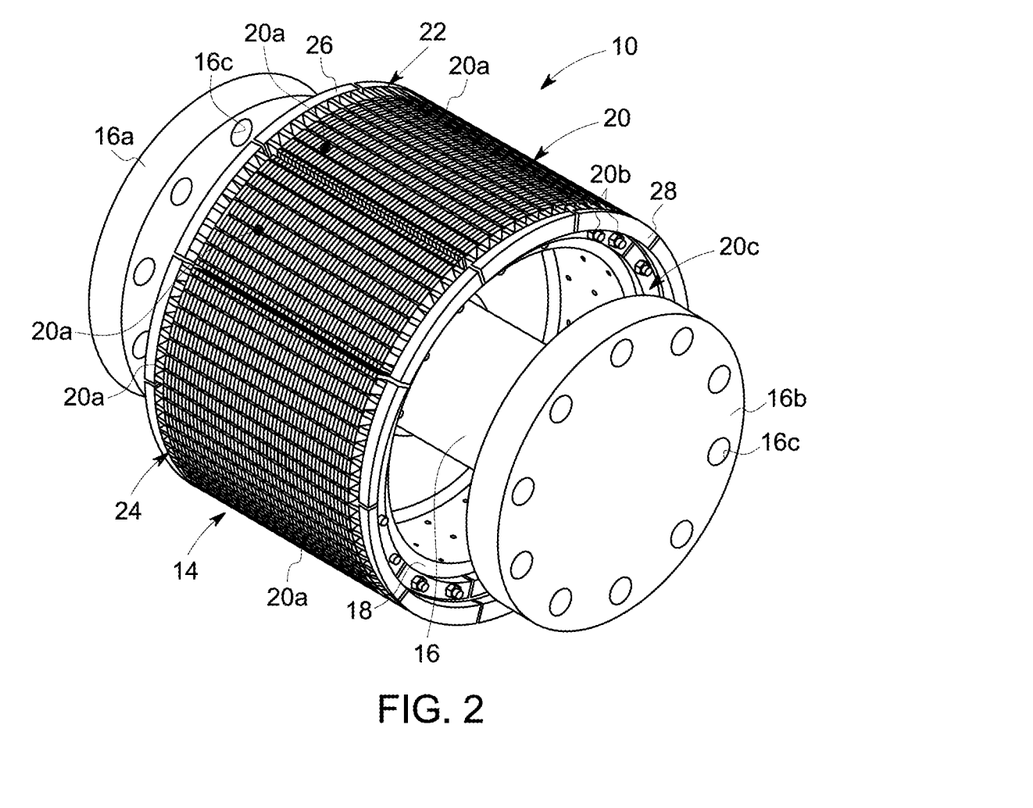
FIG. 2 is a perspective view of the asynchronous electrical machine of FIG. 1, without the stator.
Figure 3:
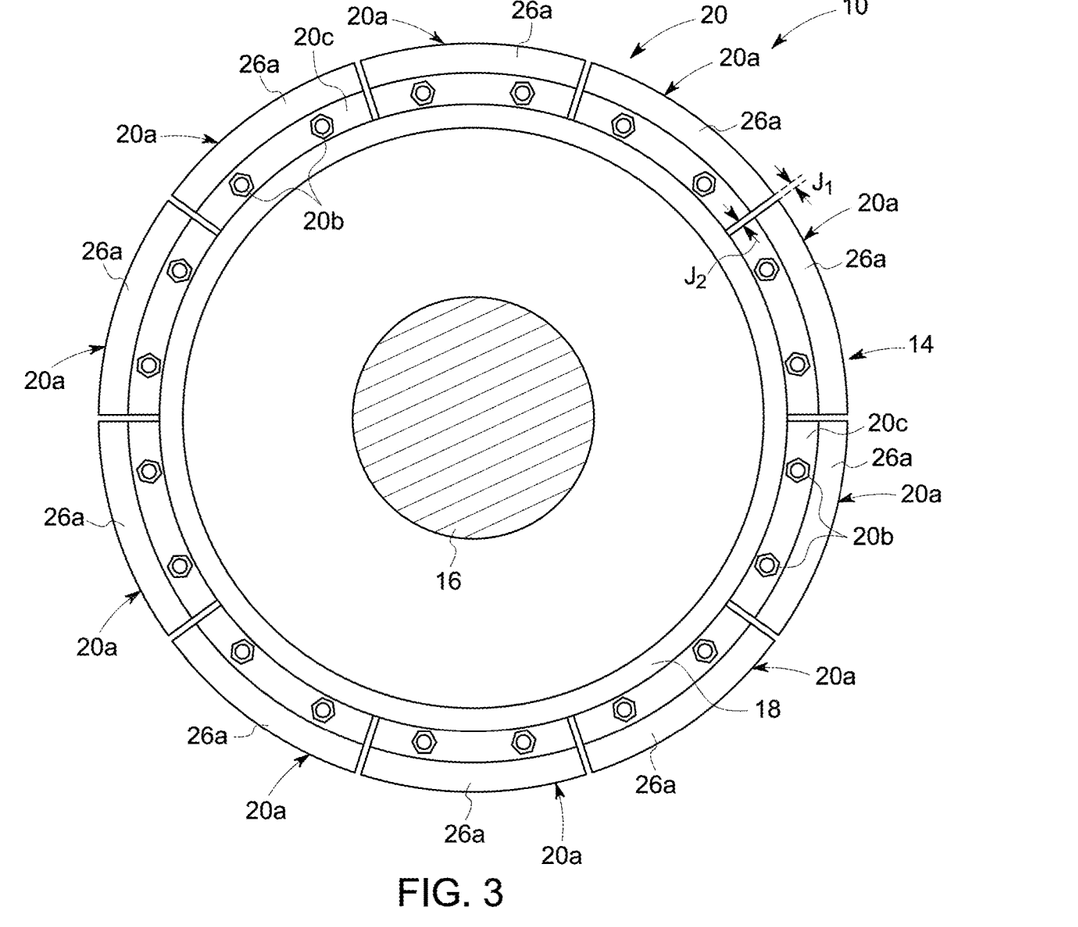
FIG. 3 is a sectional view along the section of FIG. 1, without the stator.

As illustrated in FIGS. 1 to 3, an asynchronous rotating electrical machine, shown as 10 in its entirety, comprises a stator 12, a rotor 14 intended to be integral in rotation with a torque transmission shaft 16 via an annular rim 18. The asynchronous electrical machine 10 operates in motor mode or in generator mode.

The asynchronous electrical machine 10 has an electrical power of between 500 kW and 10,000 kW, in an embodiment between 1,000 kW and 5,000 kW. The asynchronous electrical machine may have a variable rotational speed, electrically supplied for example, by a variable frequency converter. This makes it possible, in motor mode, to provide a torque to the transmission shaft regardless of its rotation speed, or in generator mode to provide electrical power at the fixed frequency of the electrical network of the site regardless of the rotation speed of the machine driving the torque transmission shaft.

The asynchronous rotor 14 has a rotation speed of between 40 rpm and 300 rpm, in an embodiment between 50 rpm and 120 rpm. The asynchronous rotor 14 has an external diameter of between 800 mm and 3,300 mm, in an embodiment between 1,500 mm and 2,600 mm.

As illustrated in detail in FIGS. 2 and 3, the rotor 14 comprises a magnetic ring 20 segmented in its circumference into ten segments or angular rotor portions 20a. Alternatively, a number of different rotor segments 20a could be provided, for example the number of rotor segments could be between two and thirty, for example eight or fourteen angular portions.

As illustrated, the rotor segments 20a are identical to each another and each form an angular portion of 36° of the rotor. Alternatively, it would be possible to provide for the angular portions to be different from each other, for example, we could provide rotor segments with angular portions of 20° and 30°, or even rotor segments, each having a different angle. However, for reasons of manufacturing costs, in embodiments design rotor segments are substantially identical.

Figure 4:
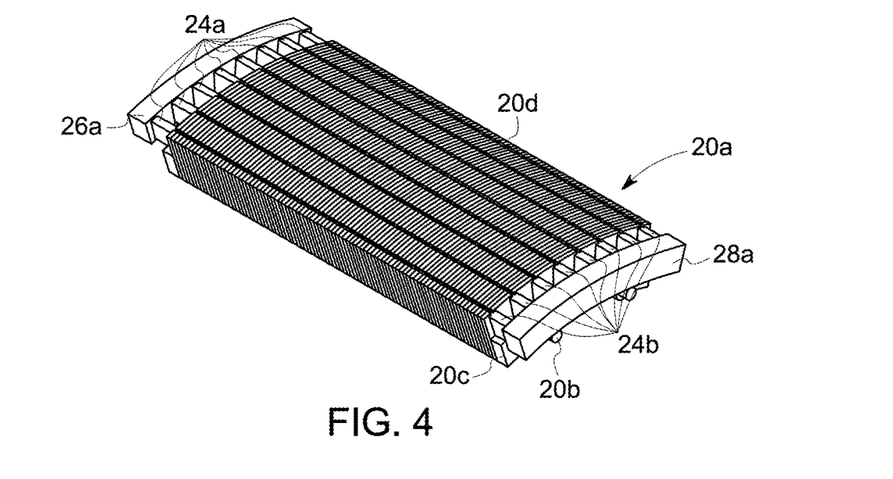
FIG. 4 is a perspective view of a rotor segment of the asynchronous electrical machine of FIG. 1.

Each rotor segment 20a comprises a plurality of axially stacked ferromagnetic metal sheets (not shown) interconnected by means of a prestressing element 20b, for example steel rods threaded at their ends cooperating with a nut, designed to compact the layers together by means of a clamping plate 20c.

Alternatively, we could provide for the layers of metal sheet to be assembled by other means, such as by gluing.

As illustrated, each layer of each rotor segment 20a comprises a ferromagnetic metal sheet segment. Alternatively, if the angular portion of the rotor segment is sufficiently large, we could provide for each layer of each rotor segment comprising a plurality of ferromagnetic metal sheet segments.

The layers of ferromagnetic metal sheets are aligned, i.e. without covering a layer of a segment by the layer of the adjacent segment, in order to form axially stacked annular ferromagnetic metal layers to recreate a magnetic ring.

Thus, each rotor segment 20a is independent and forms an angular portion of the magnetic ring 20 of the asynchronous rotor 14.

The magnetic ring 20 comprises a number of rotor segments 20a totally independent of the number of electrical poles of the asynchronous electrical machine 10. By way of non-limiting example, the asynchronous electrical machine can comprise sixteen electrical poles, i.e. sixteen electrical poles of the stator and sixteen electrical poles induced in the magnetic ring 20 of the rotor 14, while the magnetic ring can be segmented into ten rotor segments 20a. The electrical poles are thus regularly distributed at 22.5° from each other. The number of electrical poles is between six and thirty-six, in an embodiment between eight and eighteen.

This differs from a synchronous electrical machine, in which it is necessary that the segmentation in angular portions of the rotor be dependent on the number of electrical poles, in particular in the case of machines of the protruding poles type where the number of electrical poles is identical to the number of constituent poles of the rotor, or in the case of cylindrical rotors, where the electrical winding or the permanent magnets of the rotor are dependent on the number of electrical poles.

In addition to the magnetic ring 20 formed by the plurality of rotor segments, the rotor 14 comprises a squirrel cage 22 comprising a plurality of conductive elements 24 regularly distributed over the periphery of the magnetic ring 20, each having two opposite ends 24a, 24b extending axially beyond the magnetic ring 20. The conductive elements 24 are made of an electrical material, such as copper, a copper alloy or aluminum. The squirrel cage 22 further comprises two rings or short-circuit crowns 26, 28, arranged axially on either side of the magnetic ring 20 and intended to connect the ends 24a, 24b of the conductive elements 24 electrically to create a squirrel cage of the asynchronous rotor 14. Each conductive element 24 is in the form of a bar extending axially on either side of the magnetic ring 20 and inserted axially in an axial notch 20d cut close to the periphery of the magnetic ring 20. As shown in the figures, the axial notch opens towards the outside of the magnetic ring, i.e. the axial notch 20d is extended by an opening or isthmus with a width less than the width of the axial notch in order to form two radial holders 20e or spoilers. The isthmus is useful in case of magnetic saturation. Alternatively, it could be provided that the axial notch cannot open, i.e. that each conductive element 24 is surrounded by material, without an isthmus.

As shown in the figures, the cross-section of the conductive bars is rectangular in shape. Alternatively, the cross-section of the conductive bars may be circular, ovoid or square in shape.

As illustrated in the embodiment of FIGS. 1 to 5, each short-circuit crown 26, 28 located at each end 24a, 24b of the conductive elements 24 is segmented in its circumference into ten crown segments 26a, 28a.

Alternatively, it would be possible to provide a number of crown segments different from the number of rotor segments 20a, such as between one and twenty, for example equal to four, equal to eight or equal to ten. In general, the number of crown segments is independent of the number of rotor segments and also independent of the number of electrical poles. For reasons of saving on manufacturing costs and for ease of maintenance, in embodiments the number of crown segments are multiples of the number of rotor segments, or even a number of crown segments identical to the number of rotor segments. In fact, in the event of a rotor segment failure, only a part of the rotor needs to be disassembled.

The crown segments 26a, 28a are electrically connected to each another in order to form an electrical ring at 360° and to ensure the electrical short-circuit of all the conductive elements 24 located in the notches of the magnetic ring 20. The crown segments 26a, 28a can be electrically connected to each other by any suitable means, such as by welding, by brazing, by electrical cables, by electrical braids or by a flexible electrical connection 29, as shown in FIG. 5, making it possible to withstand the circumferential thermal expansions of the crown segments 26a or 28a caused by the passage of the electrical current through the crown 26 or the crown 28.

Figure 5:
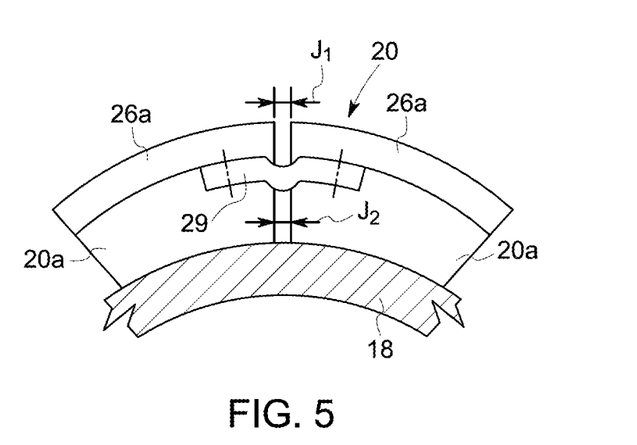
FIG. 5 is a detail view of a means for connecting two short-circuit crown segments to each another electrically.

As illustrated in FIGS. 3 and 5, the crown segments 26a or 28a are circumferentially spaced by a circumferential clearance J1, in order to facilitate the assembly of the crown segments between them. This circumferential clearance J1 can be subsequently filled by welding or brazing or be conserved to allow for thermal expansions, in particular in the case where the crown segments are connected to each other by the flexible electrical connection 29. The circumferential clearance J1 measures between 0.2 mm and 5 mm.

As illustrated in FIGS. 1 to 8, the annular rim 18 is forged directly onto the torque transmission shaft 16 and forms a single 360° block. Alternatively, the rim 18 could be integral with the torque transmission shaft 16 by other means, for example, the rim and the shaft could be molded, the rim could be welded to the shaft or made integral with the shaft by a mechanical assembly, for example screwed or shrunk on the shaft. It could also be provided that the rim is made from a plurality of rim segments or angular portions, as will be seen in other embodiments described in the remainder of the description.

Figure 6:
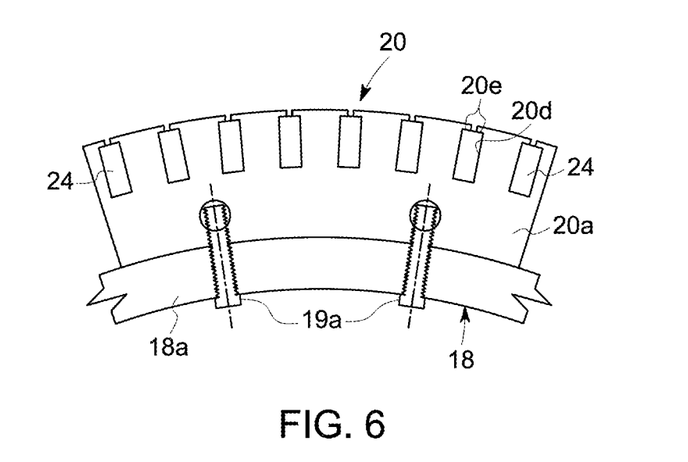
FIGS. 6 and 7 illustrate two examples of different embodiments of the fixation of a rotor segment to a rim of the electrical machine of FIG. 1.

The external surface (not shown) of the rim 18 is intended to be fixed to the asynchronous rotor 14 by means of radial screws 19a, as shown in FIG. 6, for example in the number of two rows per rotor segment 20a. Alternatively, the fixing of the rotor segments to the rim could be provided by means of studs and nuts.

Figure 7:
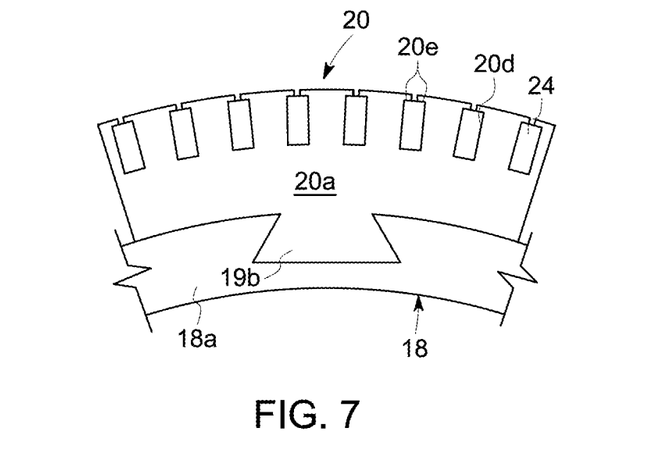

It would also be possible to provide for the fixing of the rotor segments to the rim by means of dovetail-type shapes 19b as shown in FIG. 7, wherein the lower surface of each rotor segment has an extrusion, for example shaped like a male dovetail, and the external surface of the rim 18 has machining form-fitting with the extrusion, for example in the form of a female dovetail, in a form-fitting relationship with the male dovetail. Alternatively, the external surface of the rim could have male dovetail-shaped extrusions and the lower surface of each rotor segment could have a female dovetail-shaped machining. Alternatively, extruded and machined T-shapes or other shapes could be provided for connecting the rotor segments to the rim in the radial direction. Alternatively, rules could be provided in the form of a male dovetail fixed to the external surface of the rim 18. It would also be possible to provide for any rule of a male element fixed to the external surface of the rim 18, over its entire length or locally, in a form-fitting relationship with a female element located on the lower surface of each rotor segment.

For reasons of ease and convenience of assembly of the rotor segments 20a to the rim 18, a circumferential clearance J2 is provided, as shown in FIGS. 3 and 5, between each rotor segment 20a. The circumferential clearance J2 measures between 0.05 mm and 5 mm, in an embodiment between 0.2 mm and 0.5 mm. In fact, a zero clearance between each rotor segments would make it impossible to assemble all the rotor segments due to their manufacturing tolerance, and a too large circumferential clearance would greatly facilitate the assembly, but this could disturb the magnetic flux lines forming between the electrical poles of the stator 12 and the magnetic ring 20 and would deprive the asynchronous electrical machine of its full-motor torque when it is operating in motor mode or at its full power when it is operating in generator mode.

In the embodiment illustrated in the figures, the torque transmission shaft 16 is an intermediate shaft of a torque transmission shaft line between a driving machine, for example a gas turbine, an electrical motor or a steam turbine, and a driven machine, such as a pump, a mill, a compressor or a propeller. In motor mode, the segmented asynchronous rotor integral with the torque transmission shaft brings additional torque to the torque provided by the driving machine. In generator mode, the segmented asynchronous rotor, driven by the torque of the driving machine, returns an electrical power available directly to the operating site via the stator of the asynchronous machine.

At each of its ends, the torque transmission shaft 16 has a mounting flange or coupling flange 16a, 16b intended for fixation to a mounting flange of an adjacent torque transmission shaft. In fact, in the case of a torque transmission shaft line of considerable length, i.e. from 10 m to 70 m, it is composed of a plurality of intermediate torque transmission shafts placed end to end to facilitate the transport, assembly and maintenance of the shaft line. Each mounting flange 16a, 16b is in the form of a disc having an external diameter φB that is greater than the diameter of the shaft 16 and including, near its periphery, boreholes 16c for accommodating fixation means, for example bolts, in order to fix two adjacent mounting flanges together.

The external diameter of the torque transmission shaft 16 is fixed mechanically by the value of the torque to be transmitted. For example, the external diameter of the torque transmission shaft 16 is between 300 mm and 1,000 mm, in an embodiment between 450 mm and 850 mm. The external diameter φB of the mounting flanges is fixed mechanically by the value of the torque to be transmitted. For example, the external diameter φB of the mounting flanges is between 700 mm and 1,900 mm, in an embodiment between 1,000 mm and 1,700 mm. Since the value of the torque to be transmitted is substantially the same over the entire torque transmission line, the diameter of the mounting flanges of all the intermediate shafts is substantially the same. Alternatively, it could be provided that the torque transmission shaft has only one mounting flange at one of its ends, and that its second end, opposite to the mounting flange, is smooth, with no flange and no means of torque transmission, or is cylindrical or conical in order to receive a torque transmission element, such as a coupling sleeve allowing the torque to be transmitted, for example, by shrinking, by hydraulic mounting or by keying.

In the exemplary embodiment illustrated in FIGS. 1 and 2, the external diameter φB of the mounting flanges 16a, 16b is smaller than the internal diameter φA of the magnetic ring 20. Alternatively, as can be seen in FIGS. 8, 9, 13, 14, 15 and 17, the external diameter φB of the mounting flanges 16a, 16b is greater than the internal diameter φA of the magnetic ring 20. In the case where the external diameter φB of the mounting flanges 16a, 16b is greater than the internal diameter φA of the magnetic ring 20, the circumferential segmentation of the magnetic ring 20 into independent rotor segments 20a is essential. In fact, an asynchronous one-piece 360° rotor could not be assembled on the torque transmission shaft between the two mounting flanges. In addition, such a unsegmented rotor would require the manufacture of the rotor directly on the torque transmission shaft, with or without the rim, i.e. it would be necessary to stack the ferromagnetic metal sheets comprising the magnetic ring directly at the utilization site of the torque transmission shaft. The rotor segments 20a can therefore be manufactured at one site and then transported to another site in order to be assembled on the torque transmission shaft. The segmentation of the rotor according to an embodiment of the invention thus has the effect of reducing the cost of manufacturing, transporting and maintaining the asynchronous electrical machine.

Figure 8:
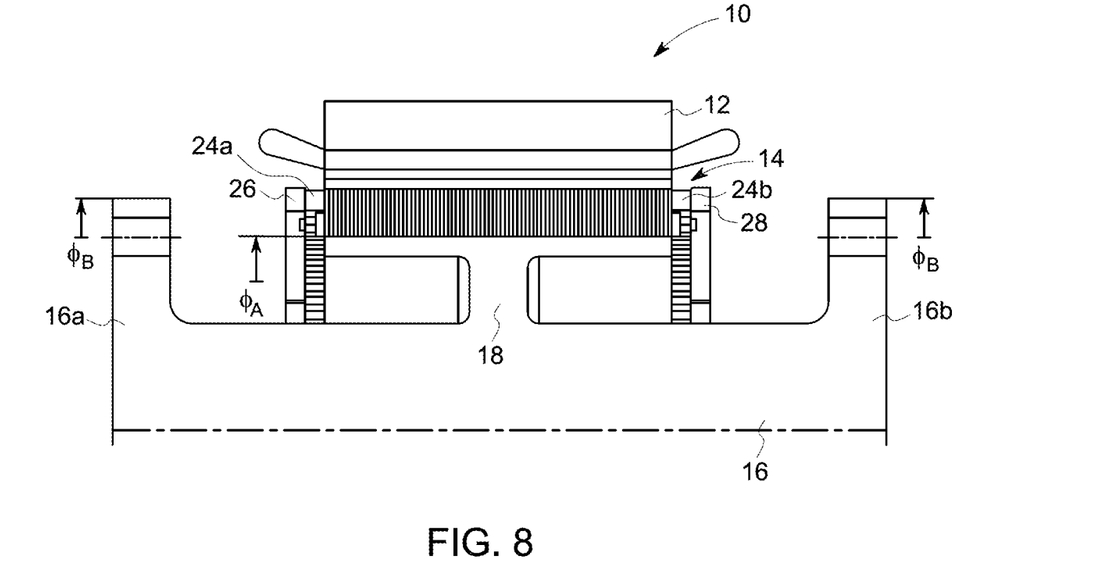
FIG. 8 is a longitudinal sectional view of an asynchronous electrical machine.

The asynchronous electrical machine 10 illustrated in FIG. 8 differs from the electrical machine illustrated in FIG. 1 solely in that the external diameter φB of the mounting flanges 16a, 16b is greater than the internal diameter φA of the magnetic ring 20.

Figure 9:
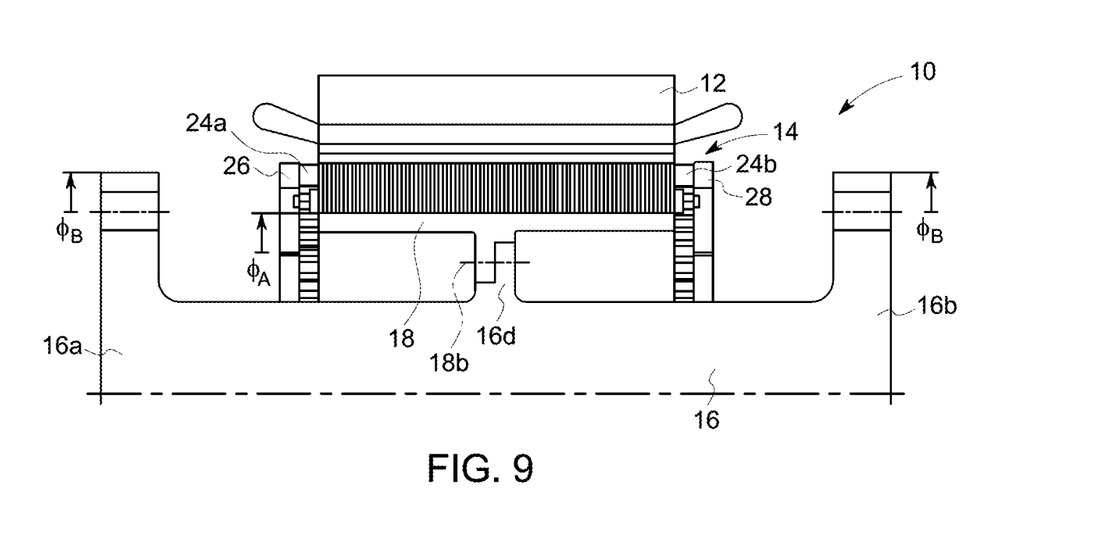
FIG. 9 is a longitudinal sectional view of an asynchronous electrical machine.
Figure 10:
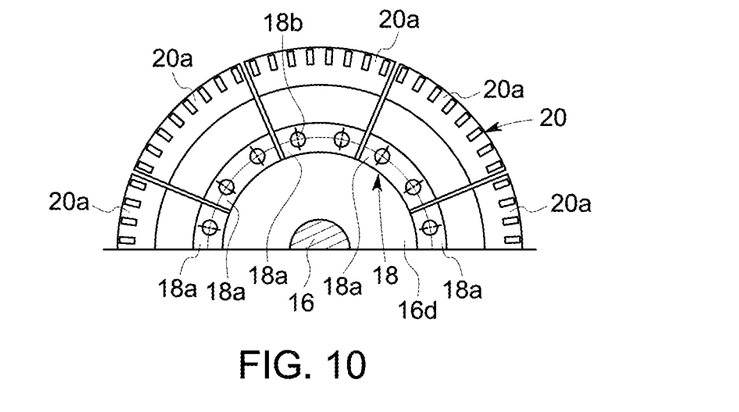
FIGS. 10 and 11 illustrate examples of the configuration of a rim of the electrical machine of FIG. 9.

The embodiment illustrated in FIGS. 9 and 10, wherein the same elements have the same references, differs from the embodiment illustrated in FIG. 8 solely in that the rim 18 is segmented in its circumference into a plurality of rim segments. As can be seen in detail in FIG. 10, the rim comprises eight rim segments or angular portions 18a. By way of non-limiting example, the magnetic ring 20 also comprises eight rotor segments 20a. This makes it easier and faster to perform maintenance on such an asynchronous electrical machine, because it is possible to disassemble only one rotor segment with its rim segment. Alternatively, we could provide a different number of rim segments, for example between two and thirty, for example equal to four, equal to five or equal to six.

Figure 11:
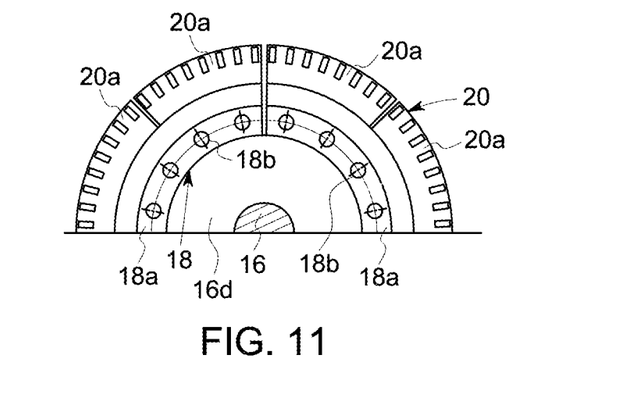

In general, the number of rim segments 18a is independent of the number of rotor segments 20a. We could thus have a rim of four rim segments supporting ten rotor segments. For maintenance reasons, an in embodiment comprises a number of rim segments which is a multiple of the number of rotor segments. Thus, in the example illustrated in FIG. 11, the rim 18 comprises four rim segments 18a, each supporting two rotor segments 20a, i.e. a total of eight rotor segments. According to another example, a rim comprising four rim segments could support, for each rim segment, three or four rotor segments, i.e. a total of twelve or sixteen rotor segments. According to another example, a rim comprising five rim segments could support, for each rim segment, two or three rotor segments, i.e. a total of ten or fifteen rotor segments.

As illustrated in FIG. 9, each rim segment 18a is made integral with the torque transmission shaft 16 by a screwed assembly 18b. To achieve this, the torque transmission shaft 16 comprises a radial extrusion of material 16d to permit the fixation of the rim segments. Alternatively, each rim segment 18a could be welded or fixed to the torque transmission shaft by other fixation means.

Figure 12:
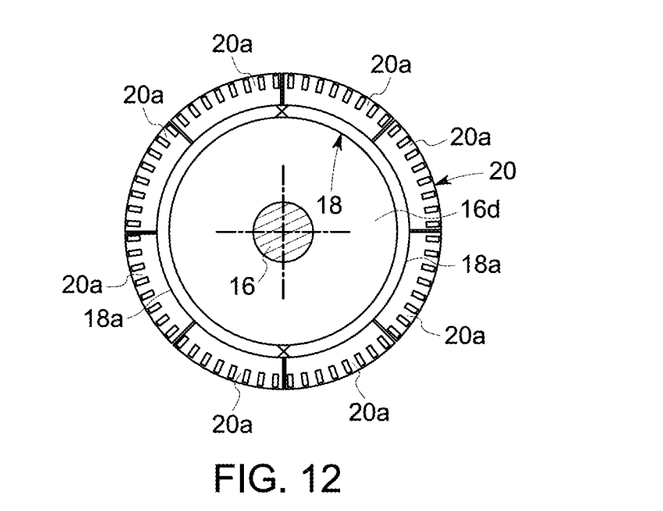
FIG. 12 is a cross-sectional view of a rim.

FIG. 12 illustrates yet another example of a segmented rim 18 in two parts welded to the joint plane and then welded to the radial material extrusion 16d. Alternatively, we could provide that the rim 18 be segmented into four parts, welded at four points, and then welded to the radial material extrusion 16d.

Figure 13:
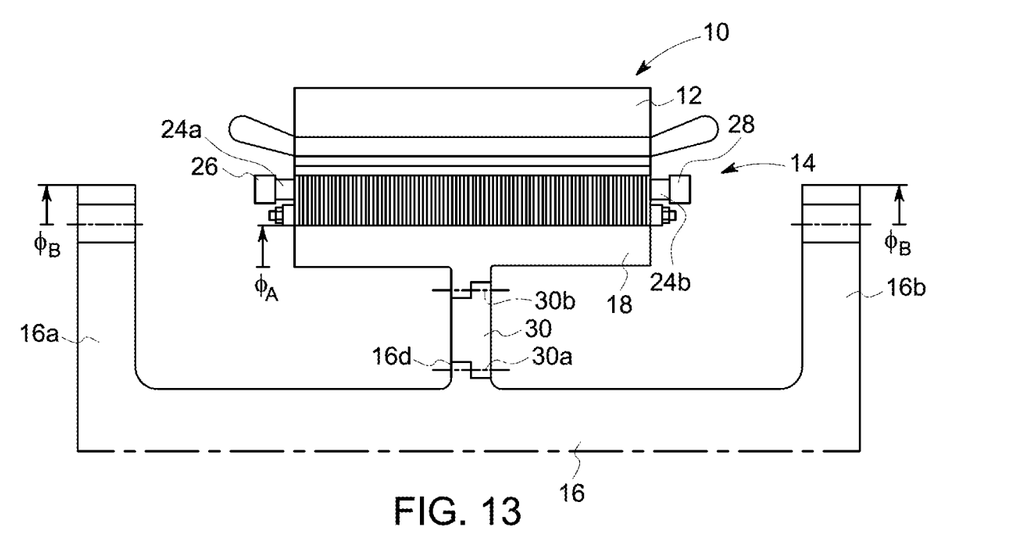
FIG. 13 is a longitudinal sectional view of an asynchronous electrical machine.

The embodiment illustrated in FIG. 13, wherein the same elements have the same references, differs from the embodiment shown in FIG. 9 in that the rim 18 is integral with the torque transmission shaft 16 via a torque transmission element 30, for example in the form of a washer. The torque transmission element is segmented in its circumference into a plurality of washer segments (not shown), for example two or four washer segments. The number of washer segments is independent of the number of rim segments.

Each washer segment is respectively made integral with the torque transmission shaft 16 and the rim 18 by a screwed assembly 30a and 30b. Alternatively, each washer segment could be welded or fixed to the torque transmission shaft by other fixation means.

By way of non-limiting example, the torque transmission element 30 can be in the form of at least two half-shells of 180° assembled and at the rim by fasteners, for example bolts, in order to fix them to the torque transmission shaft and to transmit the torque by adhesion.

Figure 14:
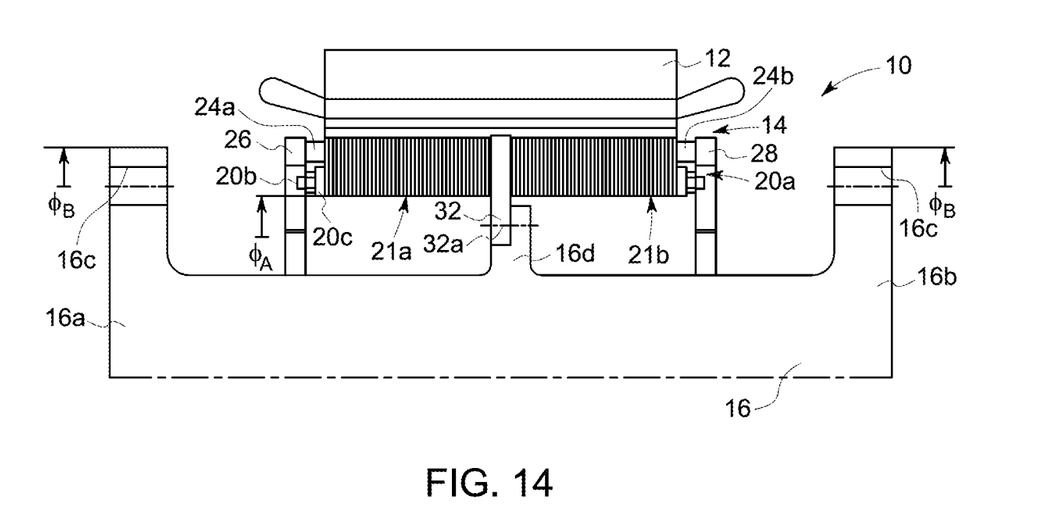
FIG. 14 is a longitudinal sectional view of an asynchronous electrical machine.

The embodiment illustrated in FIG. 14, wherein the same elements have the same references, differs from the embodiment shown in FIG. 9 only in that each rotor segment 20a of the magnetic ring comprises, in the axial direction, two half-segments 21a and 21b that are identical to each other and are axially fixed on either side of a central metal sheet 32, for example made from a conductive metal material such as steel. Each rotor half-segment 21a, 21b comprises a plurality of successive layers of axially stacked ferromagnetic metal sheets. The conductive elements 24 of the squirrel cage 22 are inserted into notches made in the periphery of each of the rotor half-segments 20a and have a first end 24a extending beyond the magnetic ring fixed to a short-circuit crown 26 and a second end 24b, opposite the first end 24a and fixed to a second short-circuit crown 28. On its periphery, the central metal sheet 32 has a plurality of holes (not shown) that allow the conductive elements 24 to pass through it. The central metal sheet 32 is fixed to the torque transmission shaft 16 by a screwed assembly 32a.

The layers of axially stacked ferromagnetic metal sheets are interconnected by means of a prestressing element 20b, for example steel rods threaded at their ends cooperating with a nut, designed to compact the layers together by means of a clamping plate 20c. In fact, in this particular case, the fixation of the metal sheet layers to each other by gluing is no longer possible because the forces applied to each of the metal sheet layers during the creation of the torque in the magnetic ring 20.

Figure 15:
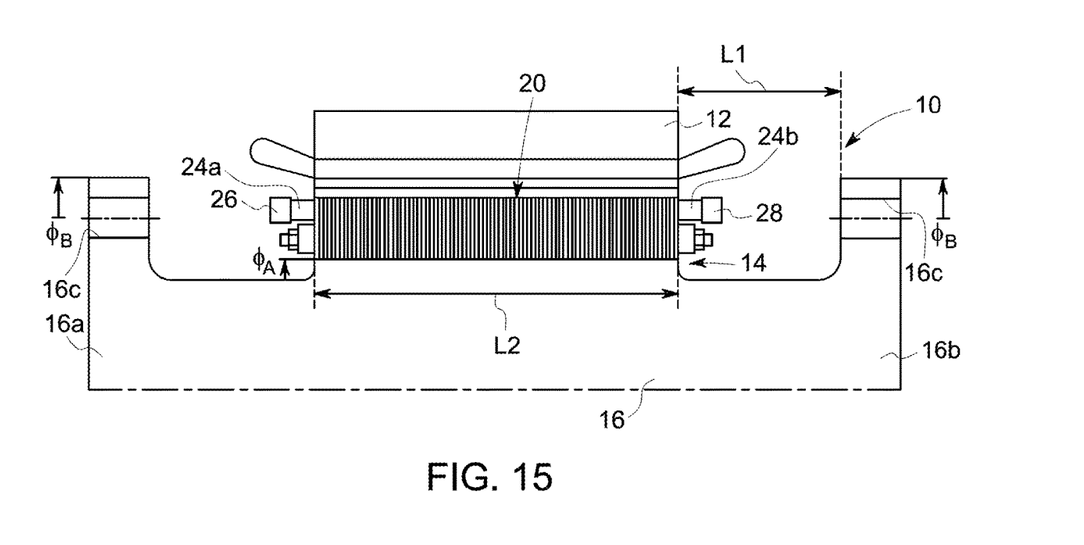
FIG. 15 is a longitudinal sectional view of an asynchronous electrical machine.
Figure 16:
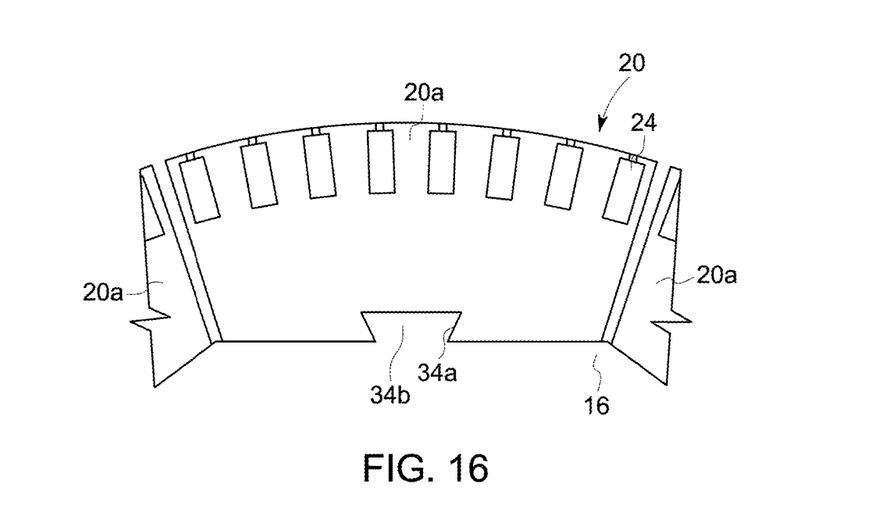
FIG. 16 is a detail view of the fixation of a rotor segment to a torque transmission shaft of the electrical machine of FIG. 15.

The embodiment illustrated in FIGS. 15 and 16, wherein the same elements have the same references, differs from the embodiment illustrated in FIG. 9 solely in that the segmented magnetic ring 20 is fixed directly to the torque transmission shaft 16, i.e. without any rim or interface between the rim and the shaft. As shown in detail in FIG. 16, each rotor segment 20a comprises, over the entire length of its lower surface, a machining in the shape of a female dovetail 34a intended to receive a male dovetail 34b. The male dovetail may be either fixed to the shaft or machined on the torque transmission shaft.

Alternatively, we could also provide that each rotor segment 20a comprises, on its lower surface, a male dovetail-shaped facet intended to be inserted into a female dovetail-shaped housing machined on the torque transmission shaft.

As illustrated in FIG. 16, the torque transmission shaft 16 can be machined in planar facets on its external surface. Alternatively, we could provide that the external surface of the torque transmission shaft is cylindrical, as well as the lower surface of the rotor segments 20a.

In general, each rotor segment 20a comprises, over the entire length of its lower surface or locally, a male or female element in a form-fitting relationship respectively with a female or male element arranged on the external surface of the torque transmission shaft 16. The form-fitting male or female elements may be dovetail-shaped, T-shaped, or of any other shape allowing the rotor segments to be held on the shaft in the radial direction.

In order to fix the rotor segments to the torque transmission shaft, it is necessary to have a distance L1 between one of the mounting flanges 16a or 16b and the rotor that exceeds the length L2 of the rotor, in order for it to be able to accommodate a rotor segment and to make it slide axially so that the female dovetail 34a cooperates with the male dovetail 34b.

In the case where the distance L1 between one of the mounting flanges 16a or 16b and the rotor is less than the length L2 of the rotor, we could provide for a dovetail shape on only one part of the length of the rotor, for example at each end of the rotor segment, in the axial direction, where each dovetail has a length equal to one-half or one third of the length L2 of the rotor. In this particular case, it is necessary to perform a succession of axial movements in order to fix each rotor segment to the male or female dovetails of the torque transmission shaft. In this case, the male dovetails are fixed to the torque transmission shaft 16, and successively according to the axial movements of the corresponding rotor segment 20a.

Figure 17:
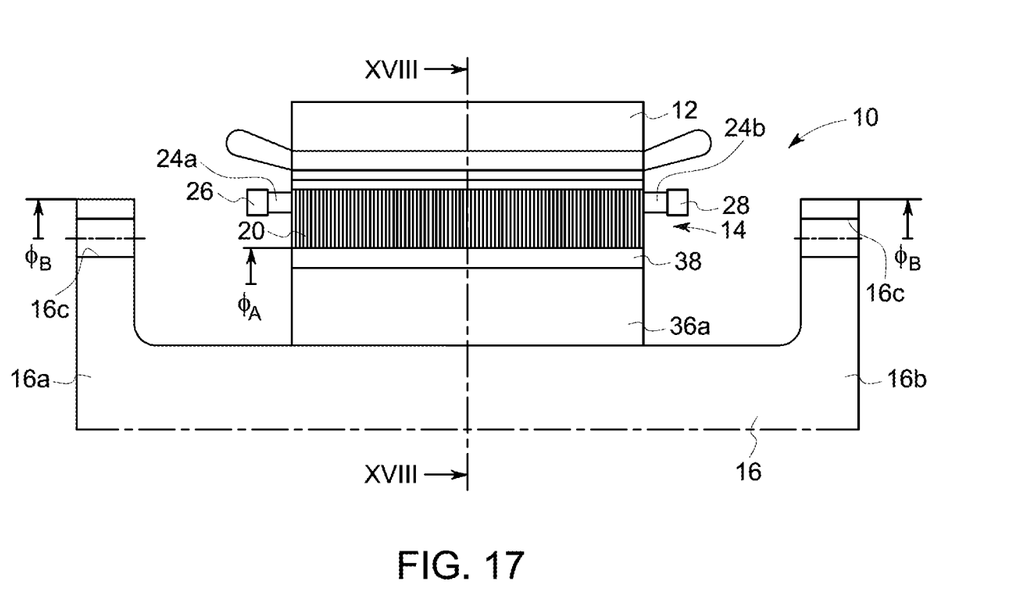
FIG. 17 is a longitudinal sectional view of an asynchronous electrical machine.
Figure 18:
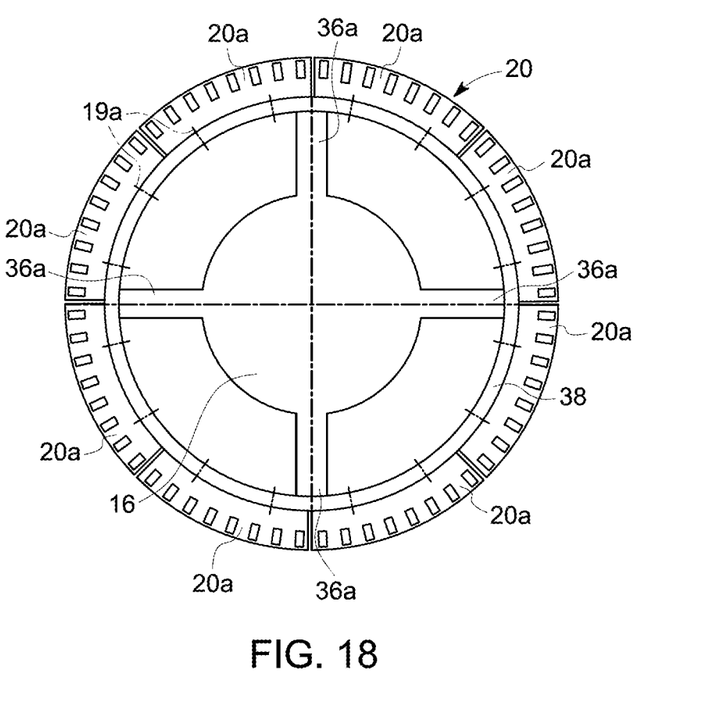
FIG. 18 is a sectional view along the section XVIII-XVIII of FIG. 17, without the stator.

The embodiment illustrated in FIGS. 17 and 18, wherein the same elements have the same references, differs from the embodiment illustrated in FIG. 8 in that the torque transmission shaft 16 has four portions 36a that are uniformly distributed on the circumference of the shaft and extend radially towards the rotor 14. Alternatively, we could provide that the torque transmission shaft 16 comprises a number of portions 36a greater than four, for example between four and twenty, and in an embodiment between six and twelve. Such a shaft is generally called an "arm shaft". The magnetic ring 20 of the rotor 14 is fixed to the torque transmission shaft 16 via an annular rim 38 that is shrunk or welded onto each of the radial portions 36a of the torque transmission shaft 16. The annular rim 38 may be, for example, of the ferrule type, i.e. a rolled metal sheet welded to the joint plane and then welded again at each radial end of the radial portions 36a of the torque transmission shaft 16.

In all of the described embodiments, the fixation of the rotor segments to the rim, segmented or not, is detailed in the reference embodiments in FIGS. 6 and 7, i.e. the fixation may be performed with radial screws 19a, as shown in FIG. 6, with bolts and nuts, or by means of dovetail shapes 19b as shown in FIG. 7, or by means of any male or female element with a form-fitting shape over the entire length of the rotor segments, or locally.

All of the illustrated embodiments can be combined with each other.

Through the segmentation of the asynchronous rotor according to an embodiment of this invention, it is possible to assemble an asynchronous rotor on a torque transmission shaft provided with mounting flanges at each of its ends having an external diameter greater than the internal diameter of the rotor.

In addition, it is possible to manufacture the rotor segments on one site and then transport them to another site to be assembled on the torque transmission shaft.

The segmentation of the rotor according to an embodiment of the invention thus has the effect of reducing the cost of manufacturing, transporting and maintaining the asynchronous electrical machine.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor for an asynchronous electrical machine, the rotor comprising
    a magnetic ring is segmented at a circumference thereof into at least two rotor segments, each of the at least two rotor segments is a detachable independent component that forms an angular portion of the magnetic ring, and each comprising a plurality of layers of ferromagnetic metal sheets stacked axially; and
    a squirrel cage having a plurality of conductive elements regularly distributed over a periphery of the magnetic ring and each conductive element of the plurality of conductive elements having two opposite ends extending axially beyond the magnetic ring and connected to a short-circuit crown which is arranged axially on either side of the magnetic ring and to connect the opposite ends of the conductive elements electrically.

2. The rotor according to claim 1, wherein a number of rotor segments is between two and thirty.

3. The rotor according to claim 1, comprising a circumferential clearance between two adjacent rotor segments, said circumferential clearance being between 0.05 mm and 5 mm.

4. The rotor according to claim 1, wherein a number of electrical poles is different from the number of at least two rotor segments.

5. The rotor according to claim 1, wherein each short-circuit crown is segmented circumferentially into at least two crown segments connected together electrically.

6. The rotor according to claim 5, wherein the crown segments are interconnected electrically by a flexible connection.

7. The rotor according to claim 5, wherein the number of crown segments is equal to or different from the number of rotor segments.

8. The rotor according to claim 5, wherein the crown segments are spaced in the circumferential direction by a circumferential clearance between 0.2 mm and 5 mm.

9. The rotor according to claim 1, wherein each rotor segment comprises two half-segments that are substantially identical to each other and are fixed axially on either side of a central metal sheet.

10. An asynchronous electrical machine comprising:
    a stator;
    a rotor according to claim 1; and
    a torque transmission shaft that is integral with the rotor.

11. The asynchronous electrical machine according to claim 10, wherein each of the at least two rotor segments is fixed to the torque transmission shaft by form-fitting male and female elements comprising a dovetail or a T-shape for holding the at least two rotor segments on the torque transmission shaft in the radial direction.

12. The asynchronous electrical machine according to claim 10, wherein each of the at least two rotor segments is fixed to the torque transmission shaft by means of a rim.

13. The asynchronous electrical machine according to claim 12, wherein a fixation of the rim with the at least two rotor segments is formed by radial screws, by studs and nuts or by form-fitting male and female elements comprising a dovetail or a T-shape for holding the at least rotor segments on the torque transmission shaft in the radial direction.

14. The asynchronous electrical machine according to claim 12, wherein the rim is segmented into at least two rim segments.

15. The asynchronous electrical machine according to claim 14, wherein a number of the at least two rim segments is equal to or different from a number of the at least two rotor segments.

16. The asynchronous electrical machine according to claim 14, wherein the at least two rim segments are welded together.

17. The asynchronous electrical machine according to claim 12, wherein a fixation of the rim to the torque transmission shaft is performed by screws or bolts, by welding or by shrinking.

18. The asynchronous electrical machine according to claim 12, wherein the rim is fixed to the torque transmission shaft via a torque transmission element between the rim and the torque transmission shaft, said torque transmission element being segmented into at least two washer segments.

19. The asynchronous electrical machine according to claim 18, wherein each of the at least two washer segments of the torque transmission element is respectively made integral with the torque transmission shaft and the rim by a screwed assembly.

20. The asynchronous electrical machine according to claim 18, wherein the torque transmission element is formed of at least two half-shells of 180° assembled together and at the rim by fasteners, the torque transmission element being fixed to the torque transmission shaft by tightening.

21. The asynchronous electrical machine according to claim 12, wherein the rim is formed in one 360° piece by forging of the torque transmission shaft.

22. The asynchronous electrical machine according to claim 12, wherein the torque transmission shaft comprises at least four radial portions regularly distributed on a circumference of the torque transmission shaft and extending radially towards the rotor, the rim being welded to free ends of the at least four radial portions.

23. The asynchronous electrical machine according to claim 10, wherein the torque transmission shaft comprises two mounting flanges at each of its ends.

24. The asynchronous electrical machine according to claim 23, wherein an external diameter of the two mounting flanges is greater than an internal diameter of the magnetic ring of the rotor.

* * * * *